(12) United States Patent
Parker

(10) Patent No.: US 9,746,549 B1
(45) Date of Patent: Aug. 29, 2017

(54) CONSTANT FALSE ALARM RATE CIRCUITRY IN ADAPTIVE TARGET DETECTION OF RADAR SYSTEMS

(71) Applicant: Altera Corporation, San Jose, CA (US)

(72) Inventor: Michael Alan Parker, Antioch, CA (US)

(73) Assignee: Altera Corporation, San Jose, CA (US)

( * ) Notice: Subject to any disclaimer, the term of this patent is extended or adjusted under 35 U.S.C. 154(b) by 571 days.

(21) Appl. No.: 14/329,768

(22) Filed: Jul. 11, 2014

(51) Int. Cl.
| | | |
|---|---|---|
| *G01S 7/292* | (2006.01) | |
| *G01S 13/02* | (2006.01) | |
| G01S 13/524 | (2006.01) | |
| G01S 13/53 | (2006.01) | |
| G01S 13/532 | (2006.01) | |
| G01S 7/35 | (2006.01) | |
| G01S 13/50 | (2006.01) | |
| G01S 13/534 | (2006.01) | |

(52) U.S. Cl.
CPC .............. *G01S 13/02* (2013.01); *G01S 7/292* (2013.01); *G01S 7/2922* (2013.01); *G01S 7/2927* (2013.01); *G01S 7/354* (2013.01); *G01S 13/50* (2013.01); *G01S 13/5244* (2013.01); *G01S 13/5246* (2013.01); *G01S 13/53* (2013.01); *G01S 13/532* (2013.01); *G01S 13/534* (2013.01)

(58) Field of Classification Search
CPC .......... G01S 2007/2883; G01S 7/292–7/2927; G01S 7/354; G01S 13/50; G01S 13/5244; G01S 13/5246; G01S 13/53; G01S 13/532; G01S 13/534

USPC .......................................................... 342/93
See application file for complete search history.

(56) References Cited

U.S. PATENT DOCUMENTS

| | | | | | |
|---|---|---|---|---|---|
| 3,701,149 | A | * | 10/1972 | Patton ................. | G01S 13/5246 342/93 |
| 3,723,738 | A | | 3/1973 | Brenner et al. | |
| 4,266,279 | A | * | 5/1981 | Hines .................... | G01S 7/2806 342/196 |
| 4,488,154 | A | * | 12/1984 | Ward .................. | G01S 13/5248 342/162 |
| 4,713,664 | A | * | 12/1987 | Taylor, Jr. ........... | G01S 13/5248 342/160 |
| 4,780,720 | A | * | 10/1988 | Watts .................... | G01S 7/2927 342/160 |

(Continued)

*Primary Examiner* — Peter Bythrow

(57) ABSTRACT

Integrated circuits may include a constant false alarm rate (CFAR) detection circuit, which may identify targets among clutter and noise in a range-Doppler map. The CFAR detection circuit may compute power values for each cell in the range-Doppler map and scan the range-Doppler map cell by cell. For this purpose, the CFAR detection circuit may compute a target value for a cell-under-test and surrounding cells and a noise value for one or more regions in local proximity of the cell-under-test on the range-Doppler map. For example, the CFAR detection circuit may perform a two-dimensional filtering to compute the target value and compute a sum of accumulated power values weighted by predetermined coefficients. The predetermined coefficients may taper at edges of the range-Doppler map and/or at edges of the regions. The CFAR detection circuit may declare a target based on a comparison of the target value and noise value.

21 Claims, 9 Drawing Sheets

(56) References Cited

U.S. PATENT DOCUMENTS

| | | | | |
|---|---|---|---|---|
| 4,970,660 A * | 11/1990 | Marchant | ............ | G06K 9/3241 342/90 |
| 5,107,249 A | 4/1992 | Johnson | | |
| 5,287,114 A * | 2/1994 | Desodt | ................ | G01S 7/2927 342/91 |
| 5,402,131 A * | 3/1995 | Pierce | .................... | G01S 13/52 342/159 |
| 5,416,488 A * | 5/1995 | Grover | ................. | G01S 7/2927 342/109 |
| 5,539,412 A * | 7/1996 | Mendelson | ............ | G01R 23/16 324/76.19 |
| 5,808,579 A * | 9/1998 | Rademacher | ........... | G01S 7/295 342/159 |
| 5,956,424 A | 9/1999 | Wootton et al. | | |
| 6,078,281 A * | 6/2000 | Milkovich | .............. | G06F 17/14 342/162 |
| 6,087,977 A | 7/2000 | Rost | | |
| 6,380,887 B1 * | 4/2002 | Suen | .................... | G01S 7/2923 342/159 |
| 6,850,186 B2 * | 2/2005 | Hellsten | ................ | G01S 13/878 342/104 |
| 6,937,185 B1 * | 8/2005 | Collazo | .............. | G01S 13/5244 342/159 |
| 7,840,075 B2 * | 11/2010 | Vacanti | ............... | G01S 13/5242 342/189 |
| 8,013,781 B2 * | 9/2011 | Stockmann | ........... | G01S 7/2923 342/159 |
| 8,194,766 B2 | 6/2012 | Kun et al. | | |
| 8,830,117 B2 * | 9/2014 | Maeno | .................. | G01S 7/2927 342/159 |
| 9,157,992 B2 * | 10/2015 | Wang | .................. | G01S 13/0218 |
| 9,234,961 B2 * | 1/2016 | Dai | ........................ | G01S 7/292 |
| 9,274,211 B2 * | 3/2016 | Maeno | .................. | G01S 7/2927 |
| 2003/0174088 A1 * | 9/2003 | Dizaji | .................. | G01S 7/2927 342/93 |
| 2006/0181451 A1 * | 8/2006 | Samson | ................ | G01S 7/2813 342/160 |
| 2006/0238412 A1 * | 10/2006 | Blunt | .................... | G01S 7/2927 342/160 |
| 2008/0030401 A1 * | 2/2008 | Kojima | .................. | G01S 7/064 342/185 |
| 2009/0231180 A1 * | 9/2009 | Shalley | ................ | G06K 9/3241 342/28 |
| 2010/0073218 A1 * | 3/2010 | Stockmann | ......... | G01S 13/5248 342/146 |
| 2010/0321231 A1 * | 12/2010 | Nakahama | .............. | G01S 7/062 342/118 |
| 2011/0025546 A1 * | 2/2011 | Cook | .................... | G01S 7/2923 342/22 |
| 2011/0102248 A1 * | 5/2011 | Maeno | .................. | G01S 7/2927 342/179 |
| 2013/0201054 A1 * | 8/2013 | Wang | .................. | G01S 13/0218 342/93 |
| 2013/0321199 A1 * | 12/2013 | Suwa | ..................... | G01S 13/46 342/196 |
| 2013/0342386 A1 * | 12/2013 | Dai | ........................ | G01S 7/292 342/179 |
| 2016/0245911 A1 * | 8/2016 | Wang | .................... | G01S 13/72 |

\* cited by examiner

_US 9,746,549 B1_

CONSTANT FALSE ALARM RATE CIRCUITRY IN ADAPTIVE TARGET DETECTION OF RADAR SYSTEMS

BACKGROUND

This invention relates to integrated circuits and, more particularly, to constant false alarm rate (CFAR) detection circuitry for adaptive target detection in radar systems.

A radar system transmits radio waves which may be reflected or scattered by target objects that are in the path of the radio waves. The radar system may also receive radio waves, which may include components from the target objects as a result of the reflection. However, the radio waves received by the radar system often include additional components caused by noise (e.g., white noise and noise from the equipment), interference with other radio waves, and clutter, which includes echoes from the surrounding landscape (e.g., hills, waves on the sea), wildlife (e.g., birds), atmospheric and meteorological phenomena (e.g., rain or turbulences), and human-made radar countermeasures.

A typical radar system may analyze the received radio waves with the goal of distinguishing between the target objects and the background of clutter, noise and interference. Once a target object has been identified, the radar system may detect the relative range, direction, and speed of the identified target object.

Many modern radar systems use an adaptive algorithm known as constant false alarm rate (CFAR) detection to decide whether a radio signal stems from a target object. Constant false alarm rate detection raises and lowers thresholds above which a target object is detected to maintain a constant probability of false alarm.

A CFAR detection scheme often computes the power level of a cell under test. The CFAR detection scheme also computes the average power level of the cells around the cell under test with the exclusion of immediate neighboring cells in case that a target object's radar response stretches over more than one cell. The CFAR detection may decide that a target object is present in the cell under test if the power level computed for the cell under test is greater than the average power level. Such an approach is also known as cell-averaging constant false alarm rate (CA-CFAR).

SUMMARY

In accordance with certain aspects of the invention, circuitry may perform cell-averaging constant false alarm rate detection for a cell under test in a range-Doppler map that shows target discrimination along a range and a Doppler axis. The circuitry may include first, second, and third circuits.

The first circuit may compute a numerator based on power values associated with cells in a first two-dimensional region of the range-Doppler map, which may include the cell under test.

The second circuit may compute a denominator based on predefined coefficients and power values associated with cells in a second two-dimensional region of the range-Doppler map, which may include the first two-dimensional region.

The third circuit may compute a test value based on the numerator and the denominator and declare a target in the cell under test when the test value exceeds a predefined threshold value.

It is appreciated that the present invention can be implemented in numerous ways, such as a process, an apparatus, a system, a device, or instructions executed on a programmable processor. Several inventive embodiments are described below.

In certain embodiments, the above-mentioned first circuit may further include a filter circuit. The filter circuit may perform two-dimensional filtering based on the power values associated with the cells in the first two-dimensional region. The filter circuit may further have a coefficient storage circuit that stores filter coefficients and a multiplier. The multiplier may receive the filter coefficients from the coefficient storage circuit and compute a product based on the filter coefficients and the power values associated with the cells in the first two-dimensional region.

If desired, the above-mentioned circuitry may further include a storage circuit that stores the predefined coefficients and the power values associated with the cells in at least a subset of the second two-dimensional region of the range-Doppler map. In certain embodiments, the predefined coefficients may vary with the values of the Doppler axis and/or depend on a position on the range-Doppler map relative to the cell under test and/or taper at edges of the range-Doppler map.

Further features of the invention, its nature and various advantages, will be more apparent from the accompanying drawings and the following detailed description of the preferred embodiments.

DETAILED DESCRIPTION

The present invention relates to integrated circuits such as programmable integrated circuits and, more particularly, to constant false alarm rate (CFAR) detection circuitry for adaptive target detection in radar systems.

As previously described, a radar system may transmit radio waves which may be reflected or scattered by a target object that is in the path of the radio waves. The reflected radio waves may be received by the radar system after a given time. The received radio waves may also have a different frequency than the transmitted radio waves.

The time difference between the transmission of the radio waves and the reception of the reflected radio waves may indicate the distance or range between the radar system and the target object, while the difference in frequency, which may be caused by the Doppler effect, may enable to measure the relative velocity between the radar system and the target object.

A radar system may sample received radio waves which are sometimes also referred to as echoes across a predetermined number of range bins. At the same time, the radar system may sample the echoes across a predetermined number of Doppler frequencies. These time domain samples may be converted to a two-dimensional matrix in the frequency domain using frequency domain processing, which may involve a Fast Fourier Transform (FFT). The two-dimensional matrix represents the received radio waves along a range axis and along a Doppler frequency axis and is sometimes also referred to as a range-Doppler map. Bins in the range-Doppler map are sometimes also referred to as cells.

As previously described, modern radar systems may use an adaptive algorithm known as constant false alarm rate (CFAR) detection to decide whether a received radio signal stems from a target object or background reflections.

It will be recognized by one skilled in the art, that the present exemplary embodiments may be practiced without some or all of these specific details. In other instances, well-known operations have not been described in detail in order not to unnecessarily obscure the present embodiments.

Figure 1:
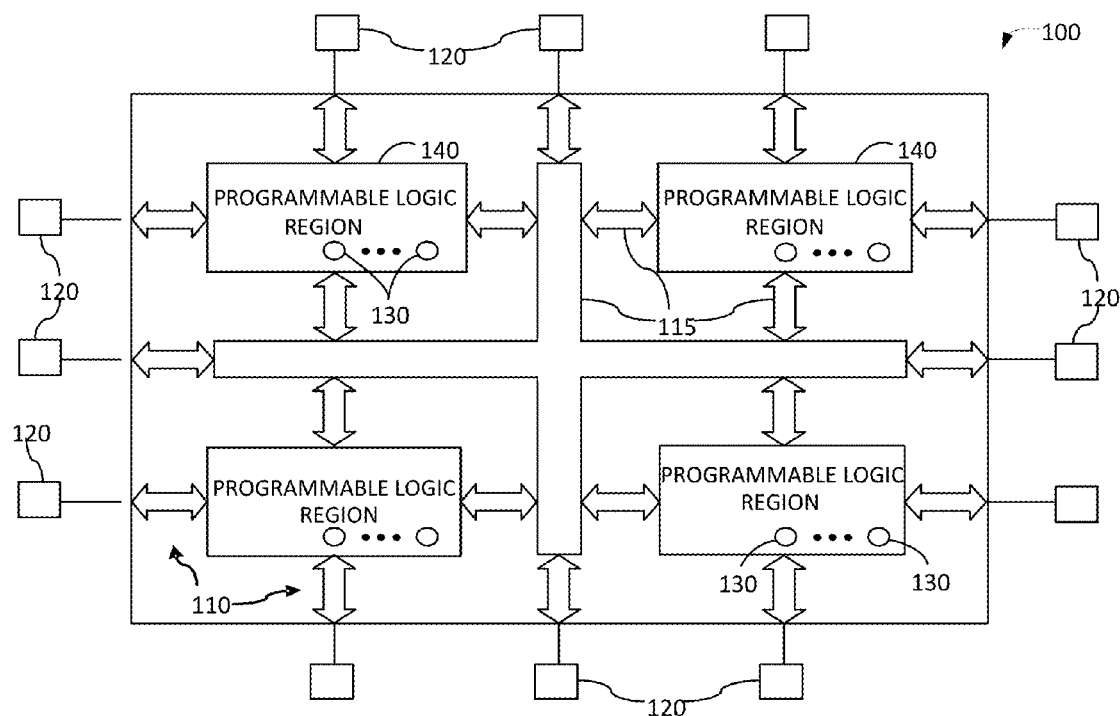
FIG. 1 is a diagram of an illustrative programmable integrated circuit that implements a cell-averaging constant false alarm rate detection scheme in accordance with an embodiment.

An illustrative embodiment of an integrated circuit such as a programmable logic device 100 that may implement an embodiment of the present invention is shown in FIG. 1.

Programmable logic device 100 has input/output circuitry 110 for driving signals off of device 100 and for receiving signals from other devices via input/output pins 120. Interconnection resources 115 such as global and local vertical and horizontal conductive lines and buses may be used to route signals on device 100.

Input/output circuitry 110 include conventional input/output circuitry, serial data transceiver circuitry, differential receiver and transmitter circuitry, or other circuitry used to connect one integrated circuit to another integrated circuit.

Interconnection resources 115 include conductive lines and programmable connections between respective conductive lines and are therefore sometimes referred to as programmable interconnects 115.

Programmable logic region 140 may include programmable components such as digital signal processing circuitry, storage circuitry, arithmetic circuitry, or other combinational and sequential logic circuitry such as configurable register circuitry. As an example, the configurable register circuitry may operate as a conventional register.

The programmable logic region 140 may be configured to perform a custom logic function. The programmable logic region 140 may also include specialized blocks that perform a given application and have limited configurability. For example, the programmable logic region 140 may include specialized blocks such as configurable storage blocks, configurable processing blocks, programmable phase-locked loop circuitry, programmable delay-locked loop circuitry, or other specialized blocks with limited configurability. The programmable interconnects 115 may also be considered to be a type of programmable logic region 140.

Programmable logic device 100 contains programmable memory elements 130. Memory elements 130 can be loaded with configuration data (also called programming data) using pins 120 and input/output circuitry 110. Once loaded, the memory elements each provide a corresponding static control signal that controls the operation of an associated logic component in programmable logic region 140. In a typical scenario, the outputs of the loaded memory elements 130 are applied to the gates of metal-oxide-semiconductor transistors in programmable logic region 140 to turn certain transistors on or off and thereby configure the logic in programmable logic region 140 and routing paths. Programmable logic circuit elements that may be controlled in this way include parts of multiplexers (e.g., multiplexers used for forming routing paths in programmable interconnects 115), look-up tables, logic arrays, AND, OR, NAND, and NOR logic gates, pass gates, etc.

Memory elements 130 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 130 are loaded with configuration data during programming, memory elements 130 are sometimes referred to as configuration memory, configuration RAM, or programmable memory elements.

The circuitry of device 100 may be organized using any suitable architecture. As an example, the logic of programmable logic device 100 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing for example multiple logic elements or multiple ALMs.

During device programming, configuration data is loaded into device 100 that configures the programmable logic regions 140 so that their resources perform desired functions. For example, the configuration data may configure the programmable logic regions 140 so that their resources implement a constant false alarm rate (CFAR) detection circuit. Such a CFAR detection circuit may include several functional blocks.

Figure 2:
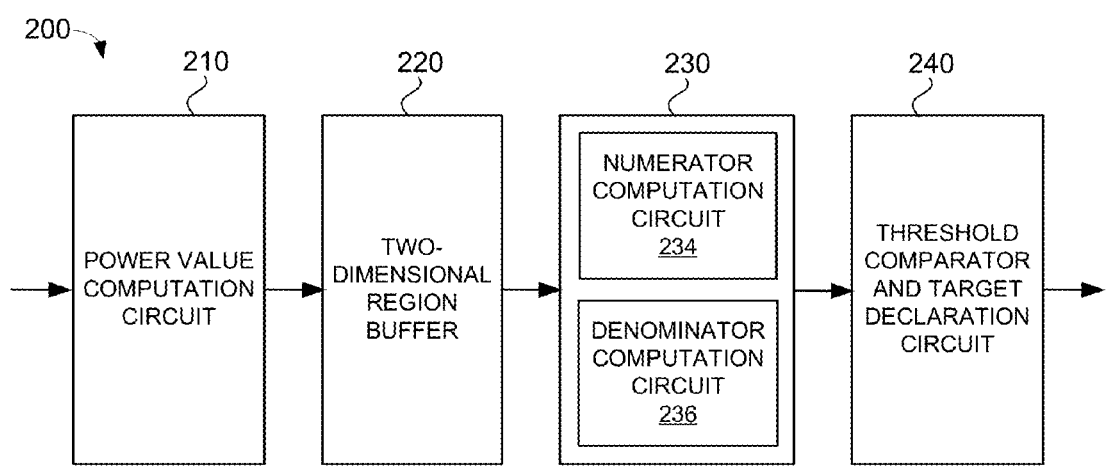
FIG. 2 is a diagram of an illustrative cell-averaging constant false alarm rate detection circuit in accordance with an embodiment.

FIG. 2 shows an illustrative diagram of several functional blocks that may implement a CFAR detection circuit 200 (e.g., using programmable logic regions 140 of FIG. 1). CFAR detection circuit 200 may include power value computation circuit 210, two-dimensional region buffer 220, threshold comparator and target declaration circuit 240, and constant false alarm rate (CFAR) ratio computation circuit 230, which may include numerator computation circuit 234 and denominator computation circuit 236.

Power value computation circuit 210 may compute power values for cells in a range-Doppler map based on one or more complex numbers. Each complex number may represent a radio signal sampled by one receiving antenna that FFT circuitry has converted to the frequency domain, and due to the use of multiple antenna elements, there may be one or more complex numbers associated with each cell in the range-Doppler map.

Consider the scenario in which power value computation circuit 210 receives and processes these complex numbers. In this scenario, power value computation circuit 210 may compute a power value for a cell of the range-Doppler map based on the magnitude (i.e., the square root of the sum of the squares of the real and the imaginary portions of the complex number) or the square of the magnitude (i.e., the sum of the square of the real portion and the square of the imaginary portion) of each complex number.

Figure 4:
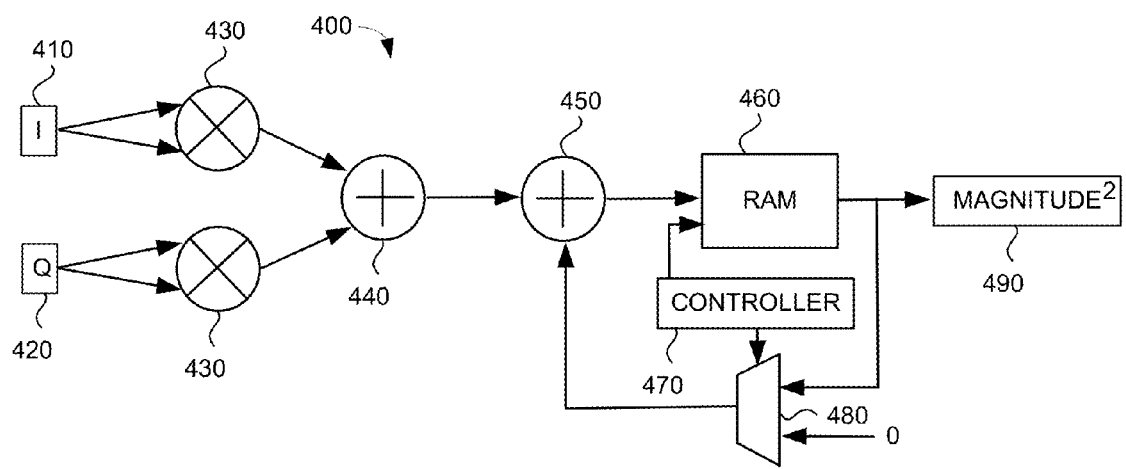
FIG. 4 is a diagram of an illustrative circuit to compute the power value of a cell in a range-Doppler map based on the complex magnitude of the Doppler Fast Fourier Transform in accordance with an embodiment.

FIG. 4 shows an embodiment of a power value computation circuit that computes power values for a cell in the range-Doppler map based on one or more complex numbers associated with the cell. As shown, power value computation circuit 400 may receive the real portion 420 and the imaginary portion 410 of a complex number. Multipliers 430 may compute the square of the real portion Q and the square of the imaginary portion I, which adder 440 may add together to compute the magnitude square of the complex number.

Adder 450, RAM 460, controller 470, and multiplexer 480 may implement an accumulator. For example, adder 450 may compute the sum of the computed magnitude square received from adder 440 and the output of multiplexer 480. Initially or every time a complex number from a different cell of the range-Doppler map is received, controller 470 may select '0' as the output of multiplexer 480. RAM 460 may store the sum produced by adder 450, and controller 470 may select the stored sum from RAM 460 as the output of multiplexer 480 until a complex number from a different cell of the range-Doppler map is received. Thus, the accumulator may produce as magnitude square 490 the accumulated sum of all magnitude squares of all the complex numbers associated with a given cell of the range-Doppler map.

As an example, consider the scenario in which each cell in a range-Doppler map has eight complex numbers, and each complex number is associated with one antenna. In this example, controller 470 may select a different address in RAM 460 when all eight complex numbers of a cell of the range-Doppler map have been received. If desired, controller 470 may produce other control signals as well. For example, controller 470 may select a different address for each complex number, or adder 450 may always write to the same address in RAM 460 and controller 470 may reset the contents at that address in RAM 460 when receiving a complex number from a different cell of the range-Doppler map.

If desired, a bank of registers that can store a number may replace RAM 460. In such a scenario, controller 470 may reset the contents of the bank of registers every time a complex number from a new cell of the range-Doppler map is received.

A storage circuit such as two-dimensional region buffer 220 of FIG. 2 may store the power values (e.g., the computed accumulated sums of the magnitude squares) of the cells of the range-Doppler map for further processing by the constant false alarm rate (CFAR) ratio computation circuit 230. Two-dimensional region buffer 220 may store power values for all cells of the range-Doppler map or only for a portion of the cells of the range-Doppler map.

Figure 5:
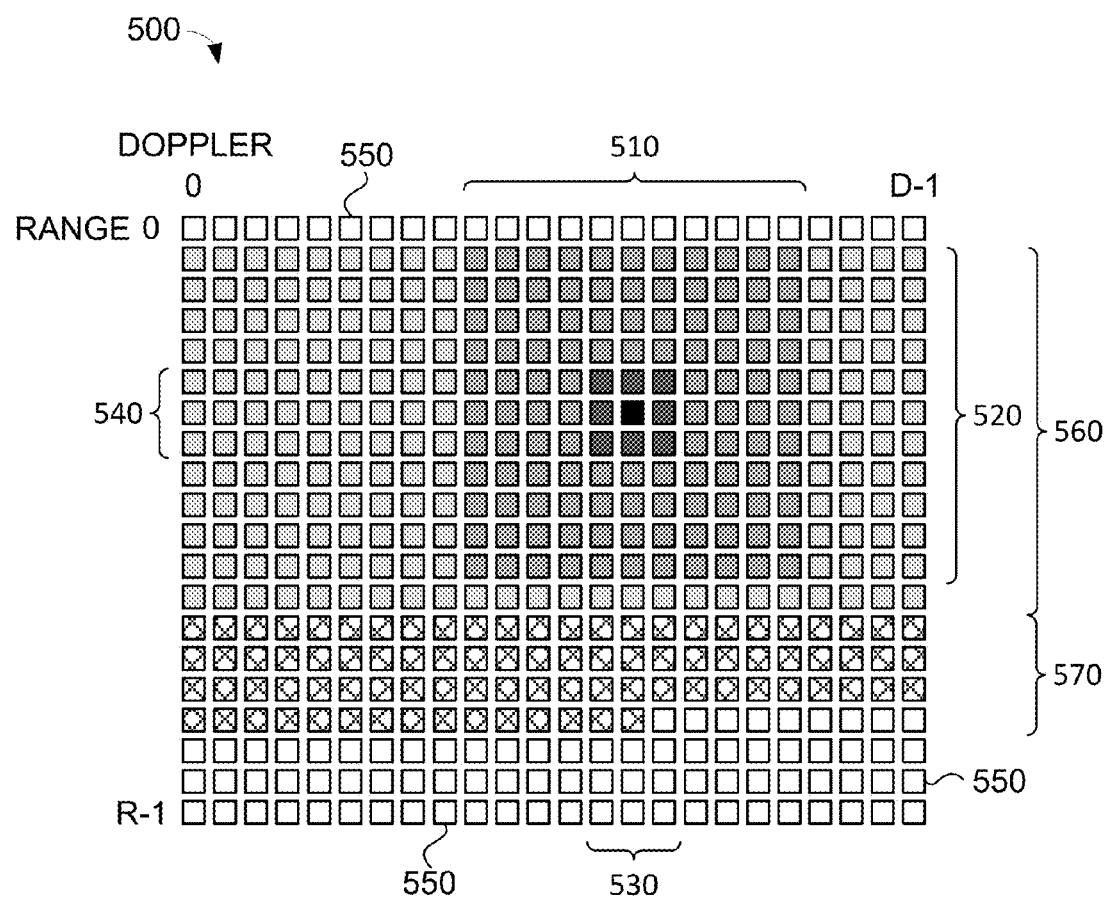
FIG. 5 is a diagram of illustrative cells in a range-Doppler map accessed by a constant false alarm rate detection circuit in accordance with an embodiment.

As an example, consider illustrative range-Doppler map 500 of FIG. 5. Range-Doppler map 500 may include R range bins from zero to (R−1) for each Doppler and D Doppler bins from zero to (D−1) for each range. Thus, the range-Doppler map may include (R*D) cells 550. Consider further that the CFAR detection circuit of FIG. 2 analyzes each cell in a given range before going to the next range. In other words, the range-Doppler map as shown is analyzed row by row and each row from the left to the right.

In this example, two-dimensional region buffer 220 of FIG. 2 may store power values associated with cells in rows 560. If desired, two-dimensional region buffer 220 may also store power values associated with cells in rows 570, which power value computation circuit 210 may compute.

If desired, the CFAR detection circuit 200 may analyze each cell of a given Doppler before going to the next Doppler. In other words, the range-Doppler map 500 may be analyzed row by row and each row from left to right. The order in which the cells in the range-Doppler map 500 are analyzed in the example above is merely illustrative and is not intended to limit the scope of the present invention. If desired, cells 550 of range-Doppler map 500 may be analyzed in any order such as diagonally from top right to left bottom or from top left to right bottom, row by row from right to left or left to right or in a zigzag pattern (i.e., one row from left to right and the next row from right to left), column by column from top to bottom or from bottom to top or in zigzag pattern (i.e., one column from top to bottom and the next column from bottom to top), just to name a few.

The order in which the range-Doppler map is analyzed may determine which power values the two-dimensional region buffer 220 stores. For example, two-dimensional region buffer 220 may store power values associated with cells in columns 510 of FIG. 5 if the range-Doppler map 500 is analyzed column by column.

Constant false alarm rate (CFAR) ratio computation circuit 230 of FIG. 2 may compute a ratio based on a numerator and a denominator. Numerator computation circuit 234 may compute the numerator, while denomination computation circuit 236 may compute the denominator. For this purpose both, numerator computation circuit 234 and denominator computation circuit 236, may access power values stored in two-dimensional region buffer 220.

In the example of range-Doppler map 500 of FIG. 5, numerator computation circuit 234 may access the cells at the intersection of columns 530 and rows 540 with the cell at the center being also referred to as the cell-under-test (CUT) and compute a numerator based on the power values of those cells. Denominator computation circuit 236 may access the cells at the intersection of columns 510 and rows 520 with the exception of the cells accessed by the numerator computation circuit 234 (i.e., except the cells at the intersection of columns 530 and rows 540).

As shown, numerator computation circuit 234 accesses a square region that includes three rows and three columns. If desired, numerator computation circuit 234 may access only the cell-under-test or a region that includes the cell-under-test and an arbitrary number of surrounding cells. The region may have any desired shape. For example, the region may include only cells in one row or only cells in one column or any combination thereof. In other words, the region may take the shape of a square, a rectangle, a diamond, a triangle, a pentagon, a hexagon, or an octagon, just to name a few.

As shown, denominator computation circuit 236 accesses a square region that includes 11 rows and 11 columns. If desired, denominator computation circuit 236 may access a region that spans an arbitrary number of rows and columns and excludes only the cell-under-test or the cell-under-test and an arbitrary number of surrounding cells (e.g., all cells that are in the row and/or the column of the cell-under-test). The region may have any desired shape such as the shape of a square, a rectangle, a diamond, a triangle, a pentagon, a hexagon, or an octagon, just to name a few. If desired, denominator computation circuit 236 may access and base the computation of the denominator on more than one region in proximity of the cell-under-test. For example, denominator computation circuit 236 may access two or more regions and each of the regions may have an arbitrary shape.

Figure 7:
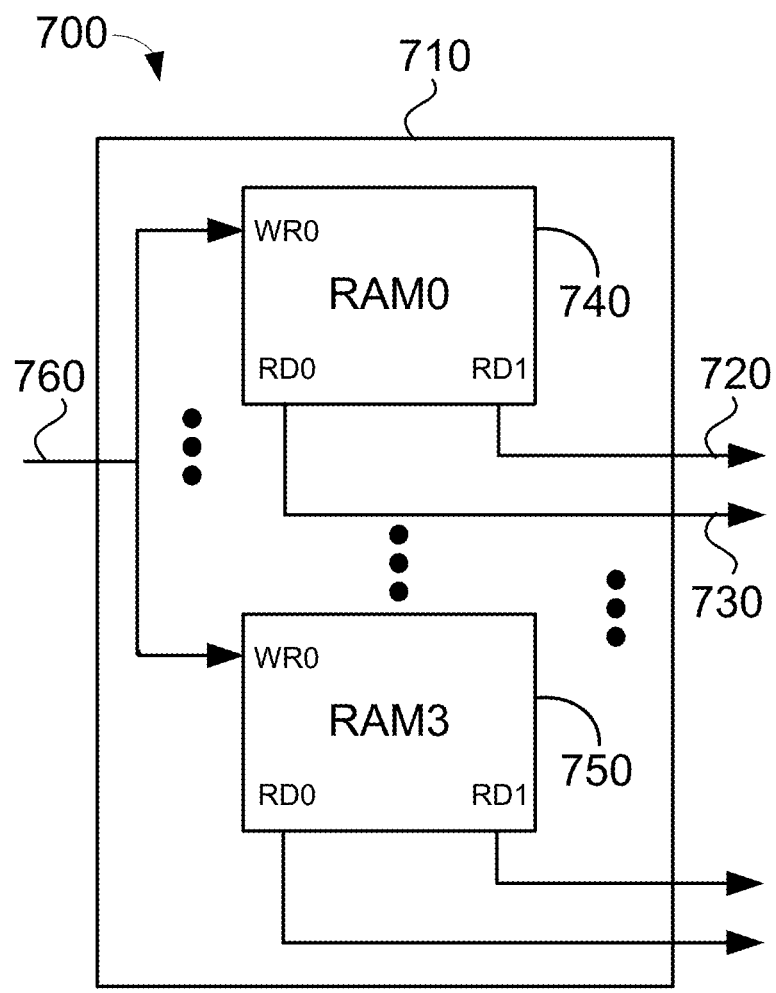
FIG. 7 is a diagram of an illustrative storage circuit that may store coefficients and power values of cells in a range-Doppler map for constant false alarm rate detection in accordance with an embodiment.

Two-dimensional region buffer 220 or another memory array may store predefined coefficients associated with at least a portion of the cells of the range-Doppler map. FIG. 7 shows an embodiment of memory array 710 that is configured to store predefined coefficients and power values associated with cells of a range-Doppler map. As an example, memory array 710 may be formed using storage circuitry of programmable logic region 140 of FIG. 1.

As shown, memory array 710 may receive a power value of a given cell of the range-Doppler map over connection 760 (e.g., from power value computation circuit 210 of FIG. 2). Memory array 710 may include multiple dual-port random-access-memories (RAMs) (e.g., RAMs 740 and 750), and a RAM associated with a respective cell of the range-Doppler map may store the power value received over connection 760 at its write port (e.g., write port WR0 of RAM 740).

In this scenario, the stored power value may be retrieved at the corresponding read port (e.g., read port RD0 of RAM 740) and provided via interconnection 730 to circuits outside of memory array 710. If desired, a RAM in memory array 710 that is associated with a cell of the range-Doppler map may also store the predefined coefficient for the respective cell. For example, RAM 740 may store the predefined coefficient associated with the cell whose power value is already stored in RAM 740. The predefined coefficient may be retrieved from another read port (e.g., read port RD1 of RAM 740) and provided via connection 720 to circuits outside of memory array 710.

If desired, predefined coefficients and power values for the same cell of the range-Doppler map may be stored at different addresses in the respective RAM or in different RAMs of memory array 710 or in different memory arrays. If desired, memory array 710 may include RAMs with a second write port. The second write port may receive coefficients to allow for adaptive coefficients. As an example, coefficients may be adjusted depending on the position of the associated cell within the range-Doppler map relative to the cell-under-test (CUT).

CFAR detection circuit 200 may use the stored coefficients to compute weighted power values (e.g., by multiplying each predefined coefficient with the respective power value of a cell in the range-Doppler map). The stored coefficients may vary with Doppler and/or range increments to provide for variable guard bands and to handle edge effects in boundary regions.

For example, the predefined coefficients may taper at edges of the range-Doppler map. If desired, the coefficients may taper at edges of a given region of cells of the range-Doppler map. As an example, the coefficients may taper at the edges of the region of cells defined by the intersection of rows 520 and columns 510 in FIG. 5. A cell region is sometimes also referred to as a window of cells or a window. Such a window of cells may form the basis for the numerator computation and/or the denominator computation performed by numerator computation circuit 234 and denominator computation circuit 236, respectively.

Figure 6:
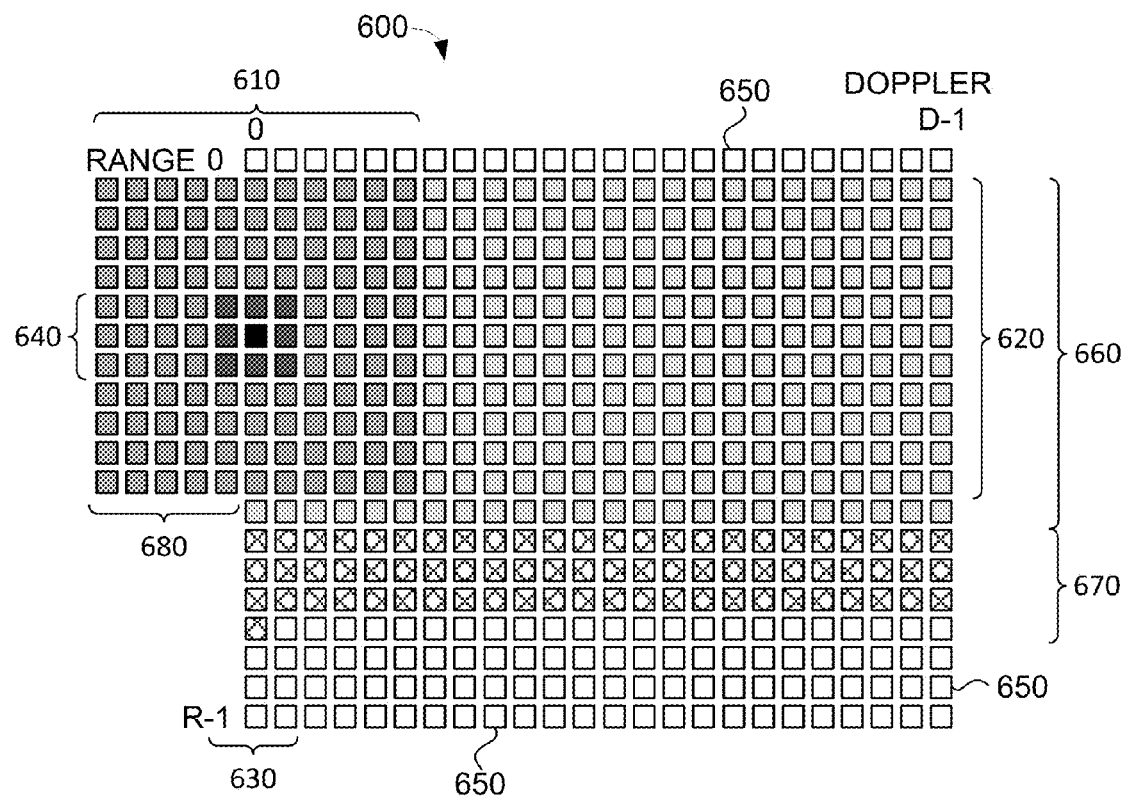
FIG. 6 is a diagram of illustrative cells on an edge of the range-Doppler map that illustrate the modelling of non-existing values outside of boundary regions with tapered coefficient values that are accessed by a constant false alarm rate detection circuit in accordance with an embodiment.

An example of using coefficients for handling edge effects in boundary regions is illustrated in FIG. 6. As shown in FIG. 6, the cell-under-test may be located in the middle of the square formed by the intersection of rows 640 and columns 630 at Doppler zero. The intersection of columns 610 and rows 620 may form the window of cells that is used for computing the denominator. However, as shown, cells 650 in columns 680 are located outside the range-Doppler map. Thus, since the power values for cells outside the range-Doppler map are zero, coefficients associated with these cells may be discarded leading to a different denominator computation compared to a window that is entirely within the range-Doppler map as shown by the intersection of columns 510 and rows 520 in FIG. 5.

To compensate for the different location of the cell-under-test relative to the edges of the range-Doppler map, coefficients associated with cells in rows 620 and columns 610 may increase at the boundaries of the range-Doppler map whenever the region defined by the intersection of rows 620 and columns 610 includes virtual cells (i.e., cells that are situated outside the range-Doppler without associated power values). For example, the region defined by the intersection of rows 620 and columns 610 of FIG. 6 includes virtual cells that are defined by the intersection of rows 620 and columns 680. In the example of FIG. 6, the coefficients may increase on the remaining cells to compensate for the missing virtual cells weighting defined by the intersection of rows 620 and columns 680, thereby providing a consistent and normalized denominator independent of the position of the cell-under-test relative to the edges of the range-Doppler map, and thus independent of the number of virtual cells in the intersection defined by rows 620 and columns 610.

Figure 3:
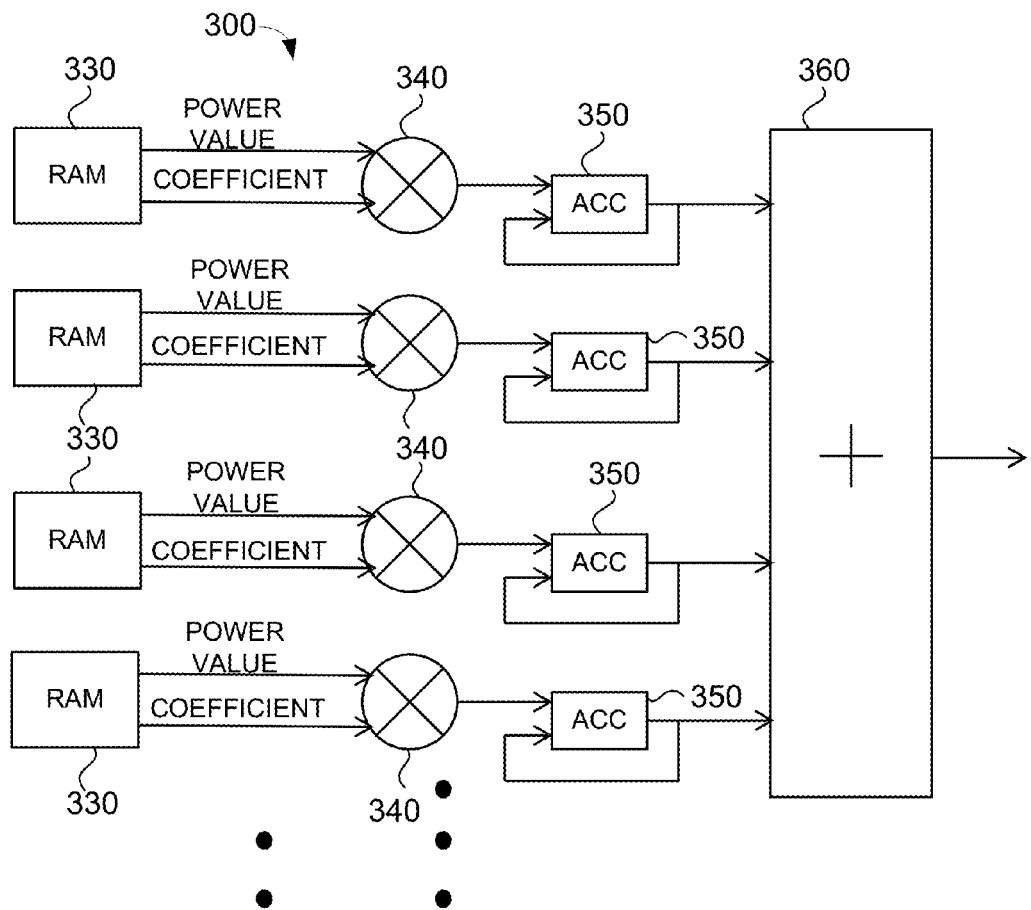
FIG. 3 is a diagram of an illustrative cell-averaging constant false alarm rate detection circuit with coefficient storage and arithmetic circuitry in accordance with an embodiment.

Numerator computation circuit 234 may compute the numerator by accessing the power values of the cell-under-test (CUT). If desired, numerator computation circuit 234 may consider neighboring cells and/or coefficients associated with the respective cells. As an example, numerator computation circuit 234 may access power values and coefficients associated with cells at the intersection of columns 530 and rows 540 of FIG. 5 and compute the accumulated sum of all weighted power values. FIG. 3 shows an embodiment of a circuit 300 that computes the sum of accumulated weighted power values.

As shown, each RAM 330 may store a coefficient and a power value associated with a cell of the range-Doppler map. A numerator computation circuit (e.g., numerator computation circuit 234 of FIG. 2) may retrieve the relevant power values and coefficients from the respective RAM 330 and compute the respective products (i.e., the weighted power values) using multipliers 340. Accumulators 350 may accumulate the weighted power values computed by multipliers 340 (e.g., in case a RAM stores power values and coefficients for more than one cell). Adder 360 may aggregate the accumulated weighted power values into a sum of accumulated weighted power values.

If desired, numerator computation circuit 234 of FIG. 2 may perform a two-dimensional filtering (e.g., using a two-dimensional finite impulse response (FIR) filter or using a two-dimensional infinite impulse response (IIR) filter), which may allow for concentrating power values from nearby cells into one peak and which may be more reliably detected. Such an approach may be beneficial in the event that peaks in power values occur at cell borders and/or spread across cells. For example, two-dimensional filtering may reduce the occurrence of detecting a same target in adjacent cells of the range-Doppler map.

Figure 8:
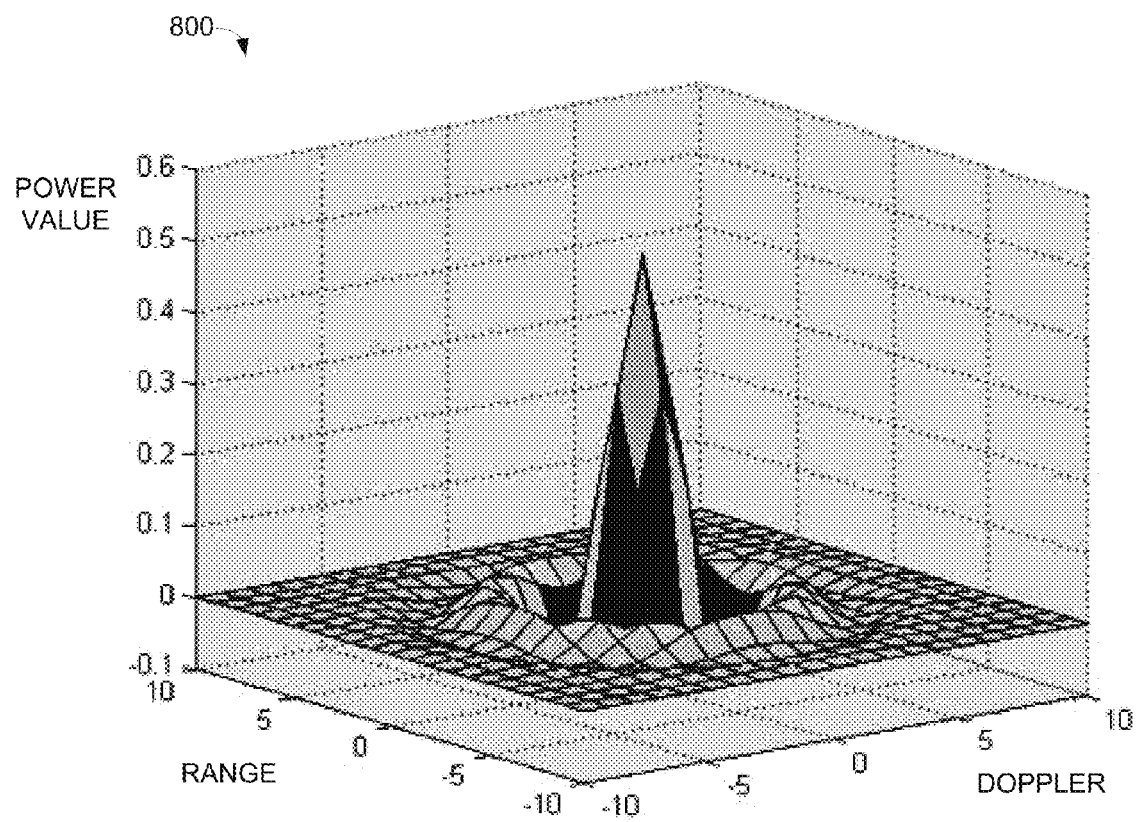
FIG. 8 is a diagram of illustrative two-dimensional filtering of power values associated with a cell under test and cells surrounding the cell under test in a range-Doppler map in accordance with an embodiment.

An example illustrating the effect of performing two-dimensional filtering on power values in a range-Doppler map is shown in FIG. 8. As shown in FIG. 8, the maximum power value from nearby cells is concentrated into the cell with the coordinates (5, 5) in the range-Doppler map, which appears to be easy to detect.

If desired, the filter coefficients of the two-dimensional filter may vary depending on the location of the cell-under-test (CUT) in the range-Doppler map which may allow for different filter bandwidths across the range or Doppler spread.

Denominator computation circuit 236 of FIG. 2 may compute the denominator by accessing the power values of the cells in at least one region in proximity of the cell-under-test (CUT) (e.g., a square region around the cell-under-test as shown in FIG. 5). If desired, denominator computation circuit 236 may consider coefficients associated with the respective cells. As an example, denominator computation circuit 236 may access power values and coefficients associated with cells at the intersection of columns 510 and rows 520 which may exclude the cells at the intersection of columns 530 and rows 540 of FIG. 5 and compute the accumulated sum of all weighted power values (e.g., using circuit 300 shown in FIG. 3).

Threshold comparator and target declaration circuit 240 may receive the numerator and the denominator from numerator computation circuit 234 and denominator computation circuit 236, respectively, and declare a target based on the received numerator, the received denominator, and a threshold. For example, threshold comparator and target declaration circuit may divide the numerator by the denominator and compare the result to a threshold. In this example, a target may be declared if the ratio between numerator and denominator exceeds the threshold.

If desired, other metrics for declaring a target may be selected instead. For example, the numerator and/or the denominator may be weighted, the denominator may be divided by the numerator, or the difference between numerator and denominator or between denominator and numerator may be compared to a threshold value, just to name a few other metrics that may be selected for declaring a target.

Figure 9:
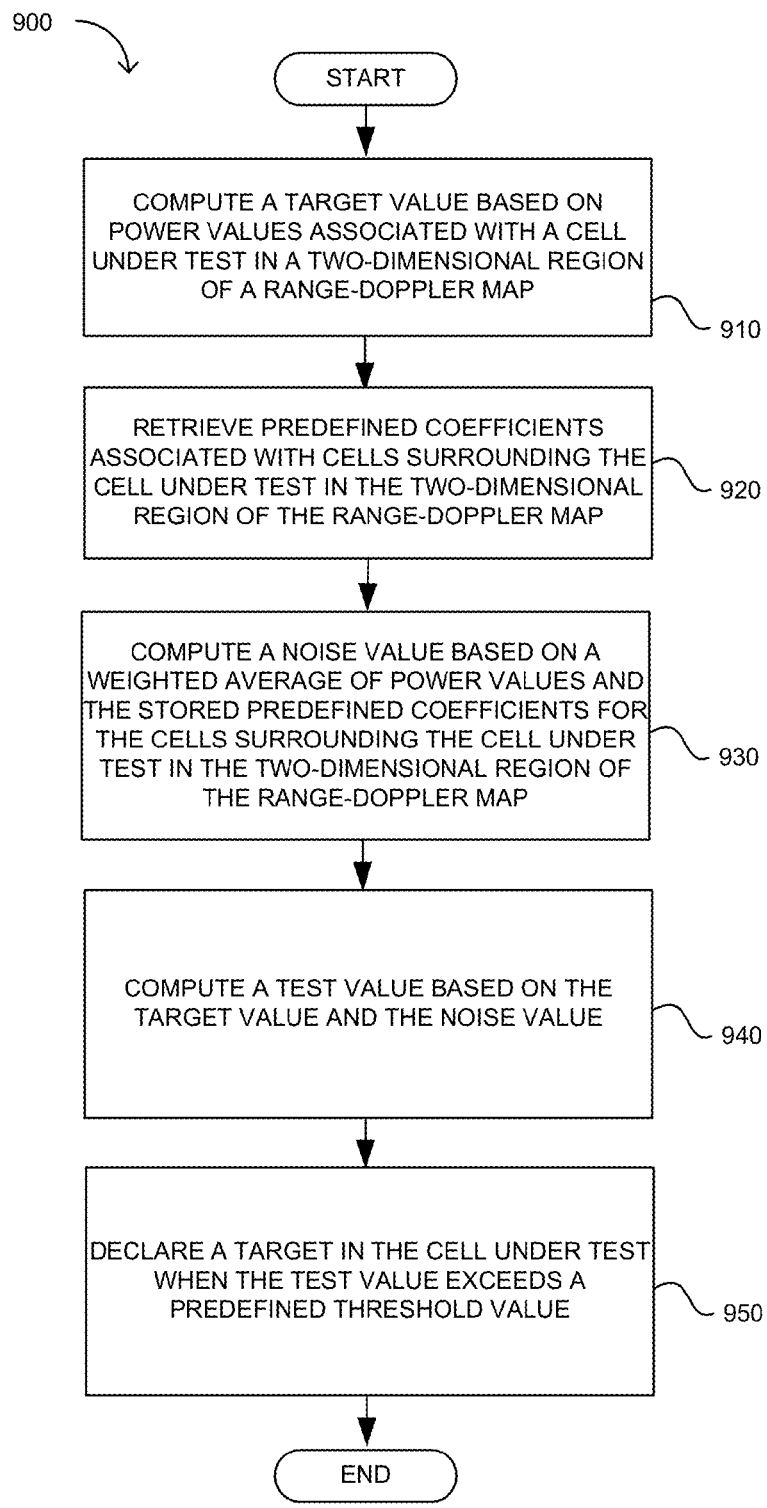
FIG. 9 is a flow chart showing illustrative steps for performing constant false alarm rate detection in accordance with an embodiment.

FIG. 9 is a flow chart showing illustrative steps that a CFAR detection circuit (e.g., CFAR detection circuit 200 of FIG. 2) may perform for constant false alarm rate detection. During step 910, the CFAR detection circuit may compute a target value based on power values associated with a cell-under-test in a two-dimensional region of a range-Doppler map. For example, the CFAR detection circuit may access power values for the cell-under-test and compute the sum of accumulated power values.

During step 920, the CFAR detection circuit may retrieve predefined coefficients associated with cells surrounding the cell-under-test in the two-dimensional region of the range-Doppler map (e.g., the CFAR detection circuit may perform a read access operation on a storage circuit). The predefined coefficients may vary depending on the location of the respective cell to the cell-under-test, and coefficients may taper at the edges of the two-dimensional region and/or at the edges of the range-Doppler map.

During step 930, the CFAR detection circuit may compute a noise value based on a weighted average of power values and the stored predefined coefficients for the cells surrounding the cell-under-test in the two-dimensional region of the range-Doppler map. For example, the CFAR detection circuit may compute the accumulated sum of all weighted power values in the two-dimensional region using circuit 300 of FIG. 3.

During step 940, the CFAR detection circuit may compute a test value based on the target value and the noise value. For example, the CFAR detection circuit may compute the ratio between the target value and the noise value. If desired, the CFAR detection circuit may employ different methods for computing the test value. For example, the CFAR detection circuit may compute the test value as the difference between the target value and the noise value, the difference between the noise value and the target value, the weighted ratio between the target value and the noise value, the ratio between the noise value and the target value, etc.

During step 950, the CFAR detection circuit may declare a target in the cell-under-test when the test value exceeds a predefined threshold value. Based on the metric used to compute the test value in step 940, the CFAR detection circuit may use a different criterion to declare a target in the cell-under-test. For example, consider the scenario where the CFAR detection circuit computes the test value as the ratio between noise value and target value. In this scenario, the CFAR detection circuit may declare a target in the cell-under-test when the test value is below a predefined threshold value.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where using CFAR detection circuitry is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing cell-averaging constant false alarm rate detection, the method comprising:

computing a target value based on at least one power value associated with a cell under test in a two-dimensional region of a range-Doppler map;

computing a noise value based on a weighted average of power values associated with cells surrounding the cell under test in the two-dimensional region of the range-Doppler map;

computing a test value based on the target value and the noise value; and declaring a target in the cell under test when the test value exceeds a predefined threshold value.

2. The method of claim 1, further comprising:

receiving a Doppler Fast Fourier Transform of a predetermined cell in the range-Doppler map; and computing the power value of the predetermined cell based on the complex magnitude of the Doppler Fast Fourier Transform.

3. The method of claim 1, wherein computing a noise value further comprises:

with a storage circuit, storing predefined coefficients associated with the cells surrounding the cell under test in the two-dimensional region of the range-Doppler map.

4. The method of claim 3, wherein the predefined coefficients taper at edges of the range-Doppler map.

5. The method of claim 3, further comprising:

selecting an address in the storage circuit based on a position of a current cell in the cells surrounding the cell under test relative to the cell under test; and retrieving a stored predefined coefficient of the current cell at the selected address.

6. The method of claim 5, further comprising:

with an arithmetic circuit, receiving the stored predefined coefficient of the current cell and the power value of the current cell; and computing at least a portion of the noise value based on the stored predefined coefficient of the current cell and the power value of the current cell.

7. A method for processing a two-dimensional range-Doppler map, comprising:

computing a power value based on at least one complex number for cells in the two-dimensional range-Doppler map, wherein the at least one complex number has a real and an imaginary portion and represents a Doppler Fast Fourier Transform that is associated with a radar signal received by an antenna;

selecting the computed power value for each cell in a subset of the cells in the two-dimensional range-Doppler map, wherein the subset includes a cell under test;

selecting a predetermined coefficient for each cell in the subset; and performing a two-dimensional filtering based on the selected power values and the selected predetermined coefficients of the cells in the subset to concentrate the selected power values into a peak power value for the cell under test.

8. The method of claim 7, wherein computing the power value based on the at least one complex number further comprises:

computing a magnitude square number for each of the at least one complex number; and accumulating the computed magnitude square numbers.

9. The method of claim 7, further comprising:

selecting the computed power value for each cell in another subset of the cells in the two-dimensional range-Doppler map;

selecting a predetermined coefficient for each cell in the other subset; and computing a noise value based on the selected power values and the selected predetermined coefficients in the other subset.

10. The method of claim 9, wherein computing the noise value further comprises:

computing a weighted average of the selected power values based on the selected predetermined coefficients.

11. The method of claim 9, further comprising:

computing a test value based on the peak power value and the computed noise value; and declaring a target in the cell under test when the test value exceeds a predefined threshold value.

12. Circuitry for performing cell-averaging constant false alarm rate detection for a cell under test in a range-Doppler map that shows target discrimination along a range and a Doppler axis, the circuitry comprising:

a first circuit that computes a numerator based on power values associated with cells in a first two-dimensional region of the range-Doppler map, wherein the first two-dimensional region of the range-Doppler map includes the cell under test;

a second circuit that computes a denominator based on power values associated with cells in a second two-dimensional region of the range-Doppler map and predefined coefficients, wherein the first two-dimensional region is a subset of the second two-dimensional region; and a third circuit that computes a test value based on the numerator and the denominator and that declares a target in the cell under test when the test value exceeds a predefined threshold value.

13. The circuitry of claim 12, wherein the first circuit further comprises:

a filter circuit that performs two-dimensional filtering based on the power values associated with the cells in the first two-dimensional region.

14. The circuitry of claim 13, wherein the filter circuit further comprises:

a coefficient storage circuit that stores filter coefficients; and a multiplier that receives the filter coefficients from the coefficient storage circuit and that computes a product based on the filter coefficients and the power values associated with the cells in the first two-dimensional region.

15. The circuitry of claim 12, further comprising:

a fourth circuit that receives a Doppler Fast Fourier Transform of a cell in the range-Doppler map and that computes the power value associated with the cell based on the complex magnitude of the Doppler Fast Fourier Transform.

16. The circuitry of claim 12, further comprising:

a storage circuit that stores the predefined coefficients and the power values associated with the cells in at least a subset of the second two-dimensional region of the range-Doppler map.

17. The circuitry of claim 16, wherein the predefined coefficients vary with the values of the Doppler axis.

18. The circuitry of claim 16, wherein the predefined coefficients vary depending on a position on the range-Doppler map relative to the cell under test.

19. The circuitry of claim 16, wherein the predefined coefficients taper at edges of the range-Doppler map.

20. The circuitry of claim 16, wherein the second circuit further comprises:

an arithmetic circuit that receives the stored predefined coefficients and the power values of the cells in the second two-dimensional region from the storage circuit and that computes the denominator based on a weighted average of the stored predefined coefficients and the power values.

21. The circuitry of claim 20, wherein the second circuit further comprises:
a circuit that computes an address of one of the predefined coefficients in the storage circuit based on a position of a predefined cell in the second two-dimensional region relative to the cell under test.

* * * * *